United States Patent
Futa et al.

(10) Patent No.: US 8,353,306 B2
(45) Date of Patent: Jan. 15, 2013

(54) FUEL DIVIDER SYSTEM FOR GAS TURBINE ENGINE

(75) Inventors: Paul Futa, North Liberty, IN (US); David Tuttle, South Bend, IN (US); David Lawrence, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 857 days.

(21) Appl. No.: 12/190,312

(22) Filed: Aug. 12, 2008

(65) Prior Publication Data

US 2010/0037612 A1 Feb. 18, 2010

(51) Int. Cl.
*G05D 11/00* (2006.01)
*F02C 7/22* (2006.01)
*F02C 7/26* (2006.01)
*F02C 9/26* (2006.01)

(52) U.S. Cl. ................. 137/118.01; 137/118.06; 60/790

(58) Field of Classification Search ............. 137/118.02, 137/118.06, 494; 60/790, 739, 734
See application file for complete search history.

(56) References Cited

U.S. PATENT DOCUMENTS

| | | | | |
|---|---|---|---|---|
| 6,092,546 A * | 7/2000 | Lebrun et al. | ............ | 137/118.06 |
| 6,135,135 A * | 10/2000 | Futa et al. | ................ | 137/115.03 |
| 6,484,510 B2 * | 11/2002 | Futa et al. | ........................ | 60/790 |
| 6,751,939 B2 | 6/2004 | Futa, Jr. et al. | | |
| 7,093,420 B2 | 8/2006 | Futa, Jr. et al. | | |
| 7,200,985 B2 * | 4/2007 | Tuttle et al. | ................ | 60/39.094 |
| 2005/0011197 A1 * | 1/2005 | Tuttle et al. | ..................... | 60/773 |

* cited by examiner

*Primary Examiner* — Dinh Q Nguyen
*Assistant Examiner* — Chee-Chong Lee
(74) *Attorney, Agent, or Firm* — Ingrassia Fisher & Lorenz, P.C.

(57) ABSTRACT

A fuel divider system includes a housing assembly and a flow passage network having an inlet, a primary outlet, and a secondary outlet. A fuel divider piston is slidably disposed within the housing assembly and movable between a flow biasing position and a flow equalizing position. A control chamber is fluidly coupled to the flow passage network and fluidly communicates with the piston. An inlet chamber, at least partially defined by the piston and the housing assembly, is fluidly coupled to the inlet. At least one channel is provided through the piston and configured to cooperate with the flow passage network to port the FD control chamber to: (i) the fuel pressure at the secondary outlet when the FD piston is in the flow biasing position, and (ii) the fuel pressure within the inlet chamber when the FD piston is in the flow equalizing position.

20 Claims, 6 Drawing Sheets

FUEL DIVIDER SYSTEM FOR GAS TURBINE ENGINE

TECHNICAL FIELD

The present invention relates generally to aircraft fuel control systems and, more particularly, to a burn fuel divider system for use in conjunction with a gas turbine engine of the type commonly deployed on an aircraft.

BACKGROUND

A gas turbine engine (GTE) may include multiple sets of nozzles that each deliver burn fuel to a combustion chamber within the GTE. These sets of nozzles may include, for example, a primary set of atomizer nozzles and a secondary set of air blast nozzles. During GTE start-up, it is generally desirable to provide a greater volume of fuel flow to the atomizer nozzles than to the air blast nozzles (i.e., "bias up" atomizer fuel flow) to achieve optimal engine lightoff conditions. However, after GTE start-up, it is generally desirable to provide substantially equal flow to the atomizer nozzles and the air blast nozzles to achieve an evenly distributed burn spray pattern in the combustion chamber. To address this need, fuel divider systems have been developed that bias up burn fuel supplied to the atomizer nozzles as a function of total metered burn fuel supplied to the fuel divider system. When little burn fuel is supplied to the system during GTE start-up, the fuel divider system provides a relatively large flow bias in favor of the atomizer nozzles. This bias decreases as the total burn fuel supplied to the system increases and ultimately disappears at an upper threshold flow rate. In this manner, the fuel divider system biases up fuel flow to the atomizer nozzles during engine lightoff conditions, while providing an equalized flow to the atomizer nozzles and the air blast nozzles during moderate to high flow engine run conditions, such as engine cruise.

Fuel divider systems of the type described above may further include an ecology valve that is fluidly coupled to the atomizer and air blast nozzles. Upon cessation of GTE operation, the ecology valve removes a predetermined volume of burn fuel from the engine fuel manifold. In so doing, the ecology valve decreases the volume of fuel available for vaporization to the atmosphere and deters coking of the atomizer and air blast nozzles. The ecology valve then returns the withdrawn fuel to the fuel engine manifold when GTE operation is again initiated.

Although addressing the need to bias up fuel flow to the atomizer nozzles during engine start-up, conventional fuel divider systems of the type described above are limited in certain respects. As explained above, such fuel divider systems bias up the volume burn fuel supplied to the atomizer nozzles as a function of the total burn fuel supplied to the system. Consequently, such fuel divider systems also bias up burn fuel supplied to the atomizer nozzles during certain post start-up conditions, such as flight idle, wherein relatively little burn fuel is supplied to the GTE through the fuel divider system. Unequal fuel distribution during such low flow post start-up conditions may result in an uneven burn spray pattern, which, in turn, may lead to heat-induced engine combustor distress in areas adjacent the atomizer nozzles. As a further limitation, fuel divider systems of the type described above permit the ecology valve to move, and thus reintroduced previously-withdrawn burn fuel to the engine fuel manifold, during GTE start-up. By prematurely introducing burn fuel to the engine fuel manifold, the ecology valve may alter the scheduled fuel distribution between the atomizer and air blast nozzles and thereby comprise ideal GTE start flow conditions.

It is thus desirable to provide a fuel divider system for use in conjunction with a gas turbine engine that biases up fuel flow to a primary set of nozzles (e.g., atomizer nozzles) during engine start-up conditions, while providing substantially equal flow to primary and secondary sets of nozzles during low flow post start-up engine conditions, such as flight idle. It would also be desirable if, in embodiments wherein the fuel divider system employed an ecology valve, the fuel divider system prevented ecology valve movement during engine start-up procedures. Preferably, in certain embodiments, the fuel divider system would assumed the form of a closed-loop hydromechanical systems so as to eliminate the need for external controllers and electronic components, such as sensors, wire harnesses, and the like. Other desirable features and characteristics of the present invention will become apparent from the subsequent Detailed Description and the appended claims, taken in conjunction with the accompanying drawings and this Background.

BRIEF SUMMARY

A fuel divider system is provided. In one embodiment, the fuel divider system includes a housing assembly and a flow passage network having an inlet, a primary outlet, and a secondary outlet. A fuel divider (FD) piston is slidably disposed within the housing assembly and movable between a flow biasing position and a flow equalizing position. An FD control chamber is fluidly coupled to the flow passage network and fluidly communicates with the FD piston. An inlet chamber, at least partially defined by the FD piston and the housing assembly, is fluidly coupled to the inlet. At least one channel is provided through the FD piston and configured to cooperate with the flow passage network to port the FD control chamber to: (i) the fuel pressure at the secondary outlet when the FD piston is in the flow biasing position, and (ii) the fuel pressure within the inlet chamber when the FD piston is in the flow equalizing position.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
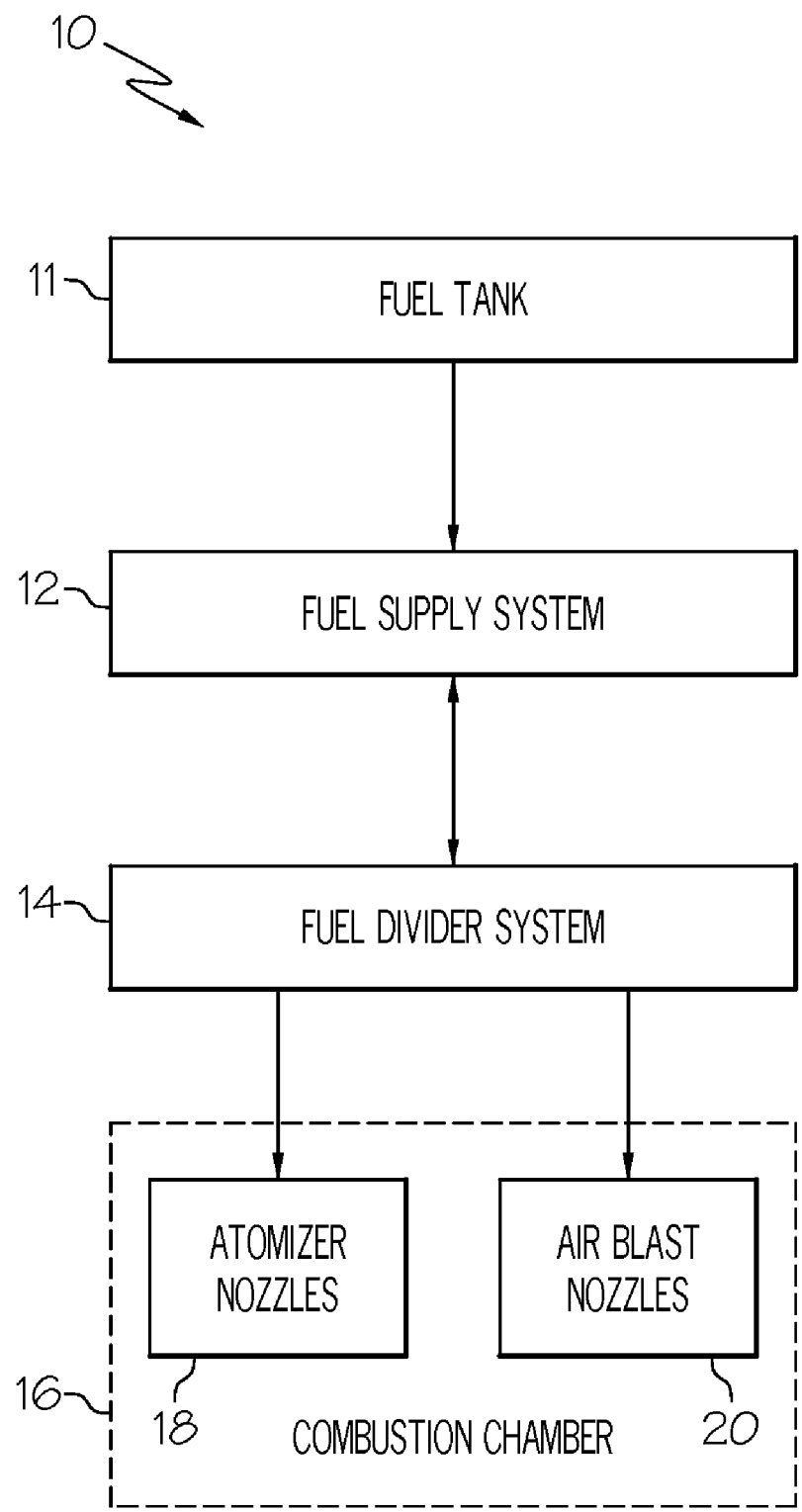
FIG. 1 is a simplified block diagram of an exemplary fuel control assembly suitable for use in conjunction with a gas turbine engine of the type commonly deployed on an aircraft.

FIG. 1 is a simplified block diagram of an exemplary fuel control assembly 10 suitable for use in conjunction with a gas turbine engine (GTE) of the type commonly deployed on an aircraft. Fuel control assembly 10 includes a fuel tank 11, a burn fuel supply system 12, and a fuel divider system 14, which are coupled in flow series. Fuel divider system 14 is further fluidly coupled to at least two sets of nozzles mounted within the combustion chamber 16 of a non-illustrated GTE. For the purposes of illustration only, combustion chamber 16 is depicted in FIG. 1 to include a primary set of atomizer nozzles 18 and a secondary set of air blast nozzles 20. Although illustrated as independent manifolds in FIG. 1, it will be appreciated that atomizer nozzles 18 may be combined with certain ones of air blast nozzles 20 to produce a number hybrid nozzles in actual implementations of fuel control assembly 10.

During operation, fuel supply system 12 provides fuel divider system 14 with metered quantities of burn fuel withdrawn from fuel tank 11. Fuel supply system 12 may comprise various components suitable for performing this function including, but not limited to, one or more boost pumps, high pressure pumps, filters, bypass valves, metering valves, pressurizing valves, and the like. Fuel supply systems suitable for use as fuel supply system 12 are well-known in the field and are thus not described further herein in the interest of concision.

Fuel divider system 14 apportions the metered burn fuel received from fuel supply system 12 between atomizer nozzles 18 and air blast nozzles 20. As will be described in more detail below, fuel divider system 14 is configured to bias up the pressure, and therefore the volume, of burn fuel flow to atomizer nozzles 18 during engine start-up conditions. At the same time, fuel divider system 14 is configured to equalize the pressure, and therefore the volume, of burn fuel supplied to atomizer nozzles 18 and air blast nozzles 20 subsequent to engine start-up. Notably, fuel divider system 14 is configured to provide an equalized burn fuel flow to atomizer nozzles 18 and air blast nozzles 20 even under post start-up conditions, such as flight idle, during which fuel supply system 12 provides fuel divider system 14 with relatively small quantities of metered burn fuel.

It is preferred, although it is by no means necessary, that fuel supply system 12 includes at least one ecology valve configured to: (i) withdraw a set quantity of burn fuel from the engine fuel manifold upon cessation of GTE operation, and (ii) reintroduce the previously-withdrawn burn fuel when GTE operation is again commenced. An exemplary embodiment of fuel supply system 12 including an ecology valve will be described below in conjunction with FIGS. 2-6. Advantageously, in the below-described embodiment, fuel supply system 12 is configured to prevent ecology valve movement during engine start-up and thereby prevent the premature reintroduction of burn fuel into the fuel manifold.

Figure 2:
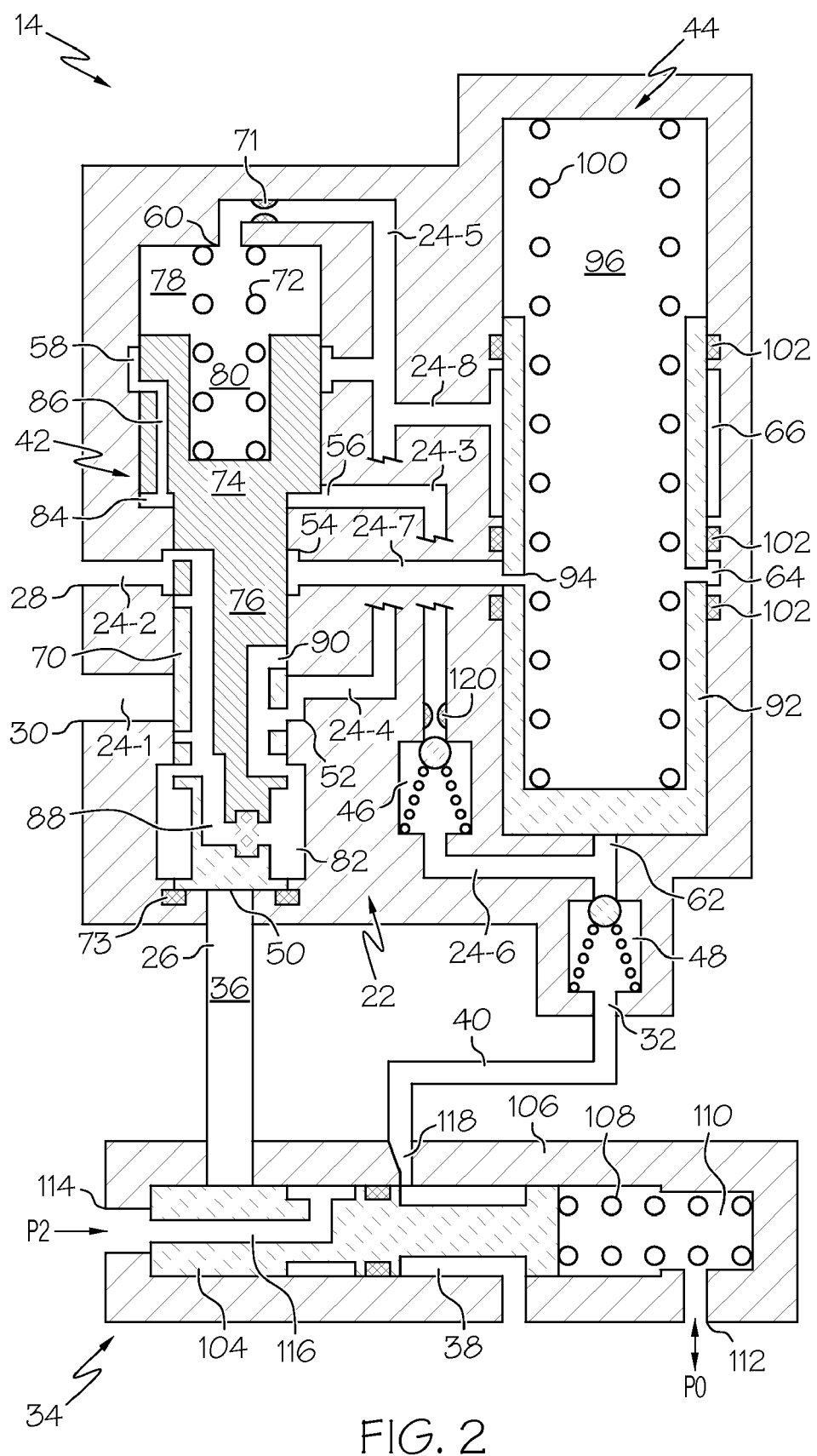
FIGS. 2-6 are simplified cross-sectional views of a fuel divider system in various stages of operation suitable for deployment within the fuel control assembly shown in FIG. 1 in accordance with an exemplary embodiment.
Figure 3:
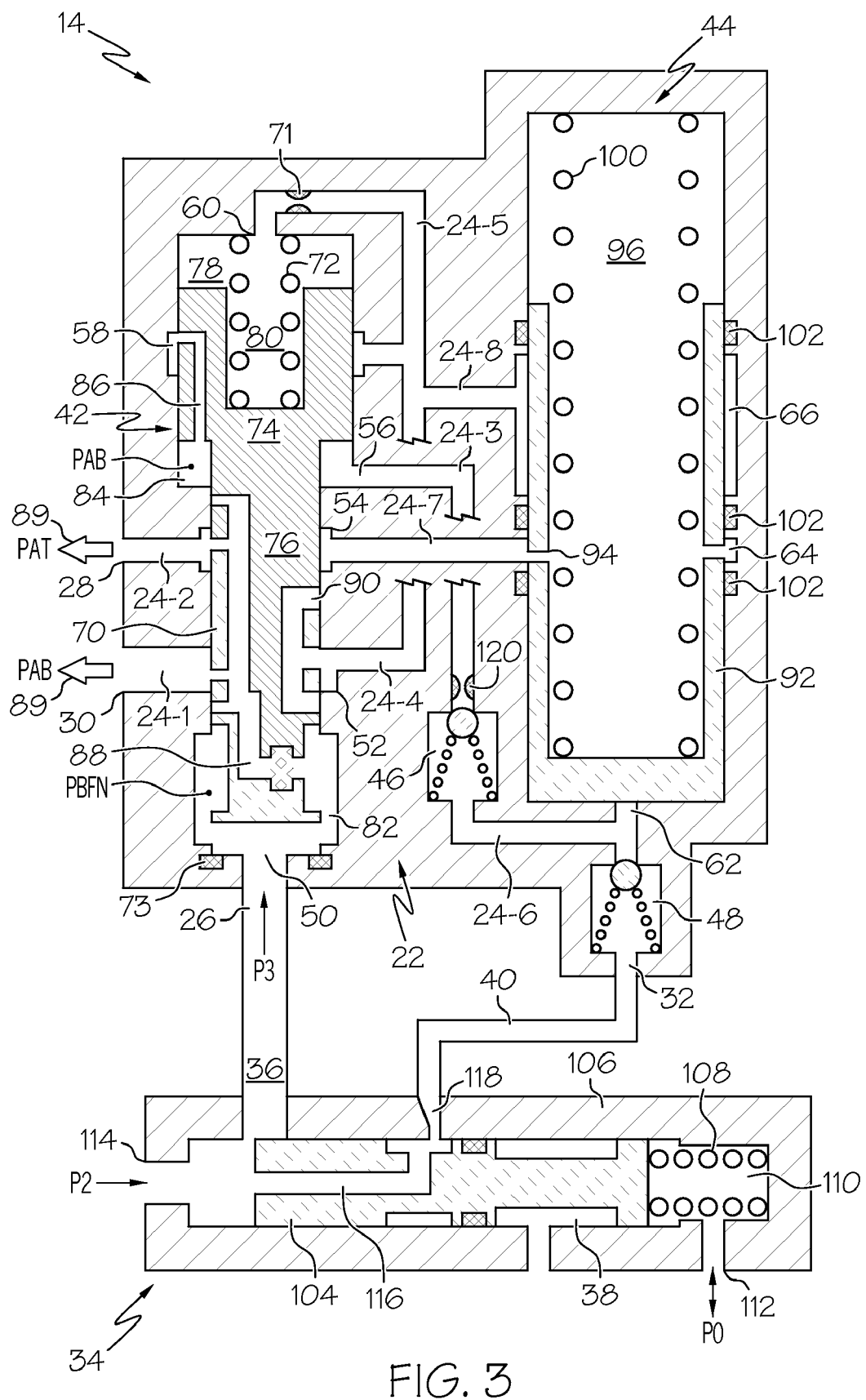
Figure 4:
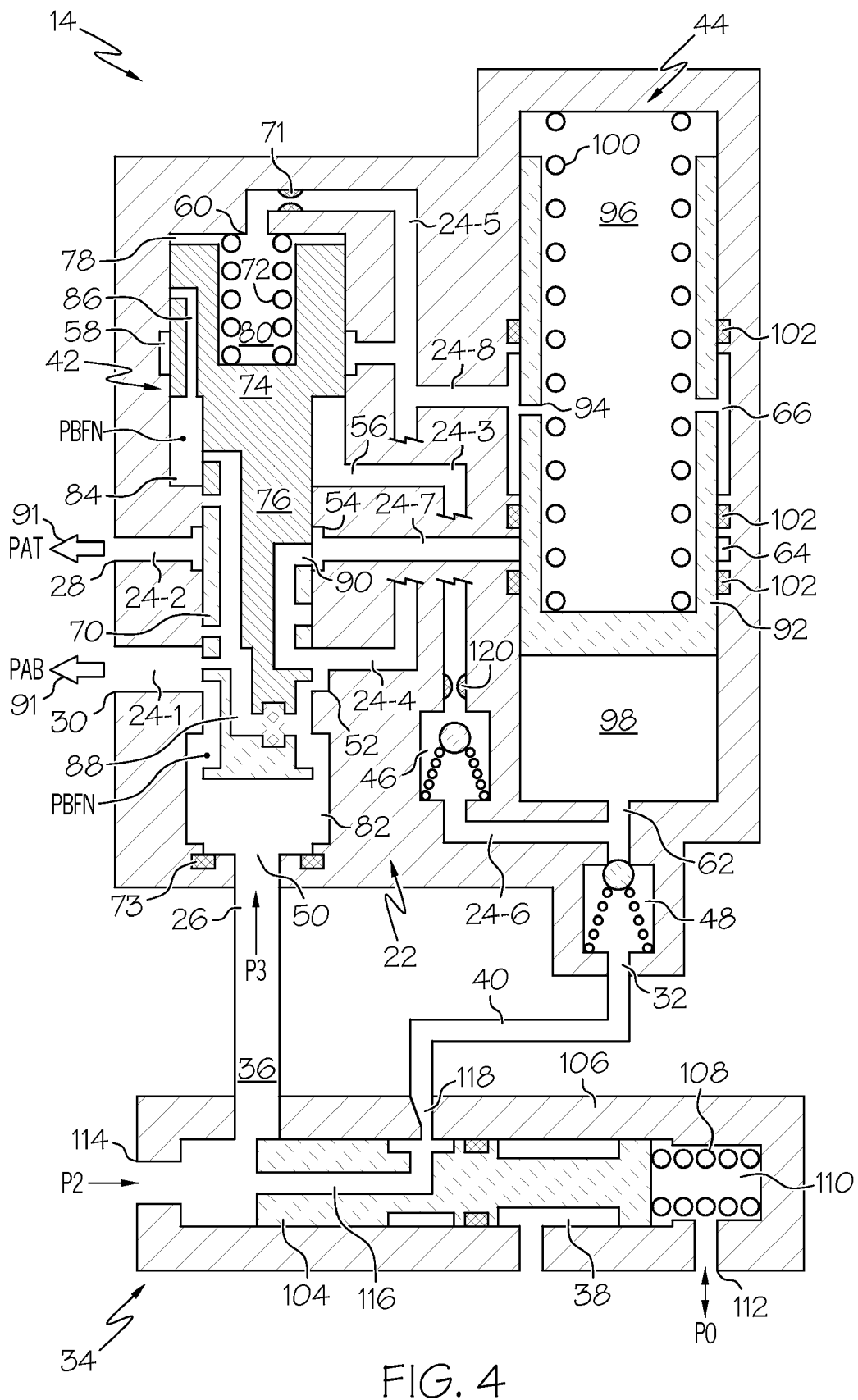
Figure 5:
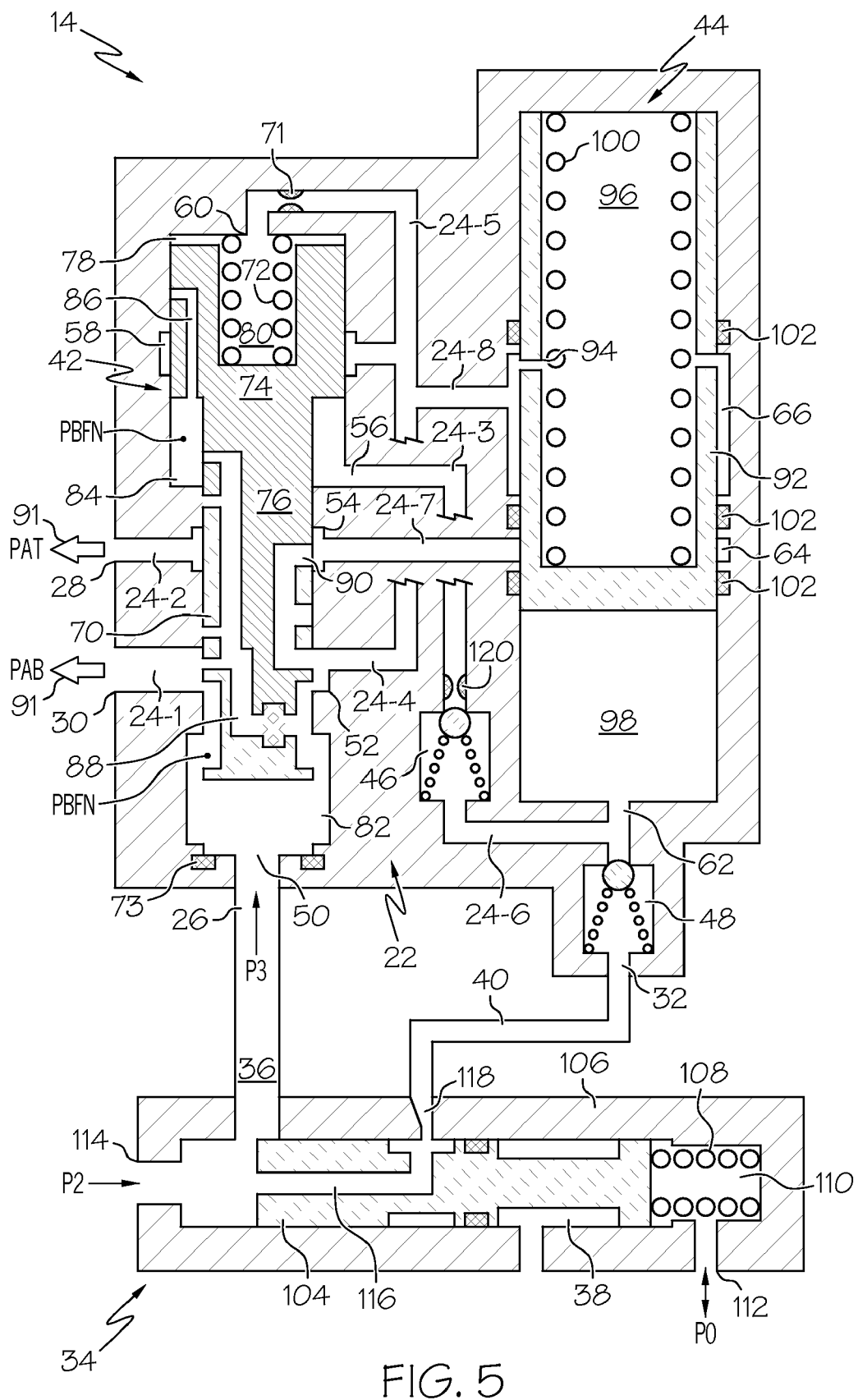
Figure 6:
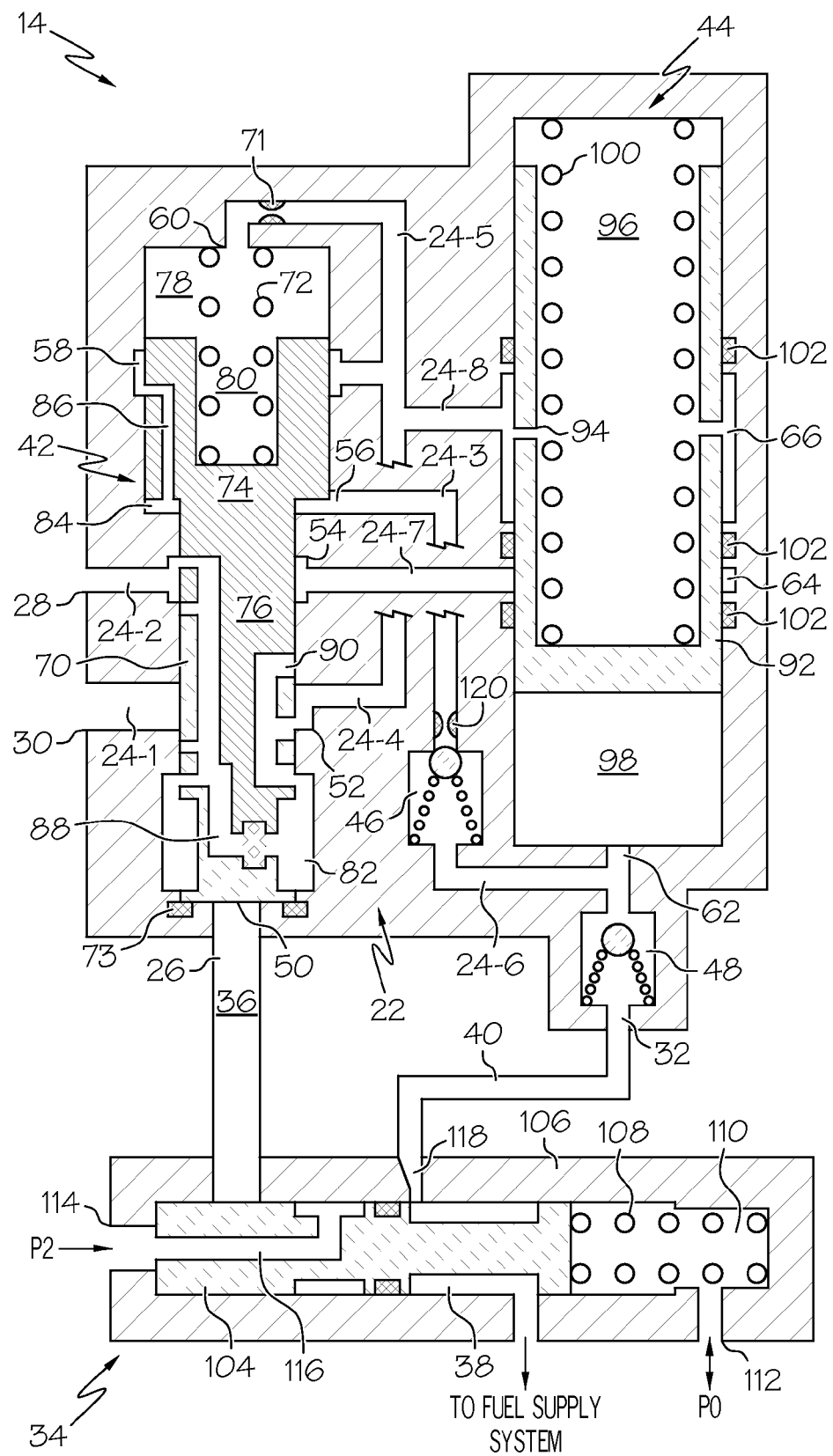

An exemplary embodiment of fuel divider system 14 (FIG. 1) will now be described in conjunction with FIGS. 2-6. Throughout the subsequent description and in FIGS. 2-6, the following acronyms are utilized to denote the following pressures:

P2 Pressurizing Valve Inlet Pressure
P3 Fuel Divider Valve Inlet Pressure
PAT Burn Fuel Flow Pressure to Atomizer Nozzles
PAB Burn Fuel Flow Pressure to Air Blast Nozzles
PBFN Total Burn Fuel Flow Pressure to Nozzles
PO Pressurizing Valve Reference Pressure FIGS. 2-6 are simplified cross-sectional views of fuel divider system 14 in accordance with an exemplary embodiment. FIGS. 2 and 3 illustrate fuel divider system 14 prior to and during engine start-up, respectively. FIG. 4 illustrates fuel divider system 14 after engine start-up and during transition to moderate to high flow engine run conditions, such as engine cruise. FIG. 5 illustrates fuel divider system 14 after engine start-up and during low flow engine run conditions, such as flight idle. Lastly, FIG. 6 illustrates fuel divider system 14 immediately after engine shut-down.

Referring collectively to FIGS. 2-6, fuel divider system 14 includes a main housing assembly 22 having a flow passage network 24 formed therethrough. Although illustrated as a unitary body in FIG. 2-6, it should be appreciated that housing assembly 22 may comprise any number of individual housing components, which may or may not be rigidly joined together. Flow passage network 24 includes a number of flow passages 24-1, 24-2 . . . 24-8; an inlet 26; a primary outlet 28; a secondary outlet 30; and a fuel return port 32. Primary outlet 28 is conveniently fluidly coupled to a primary set of nozzles, such as atomizer nozzles 18 (FIG. 1), and secondary outlet 30 is conveniently fluidly coupled to a secondary set of nozzles, such as air blast nozzles 20 (FIG. 1). A first connecting conduit 36 fluidly couples inlet 26 to a fuel pressurizing valve 34, which may be included in fuel supply system 12 (FIG. 1). Similarly, a second connecting conduit 40 fluidly couples fuel return port 32 to aircraft fuel tank 11 (FIG. 1) through one or more components of fuel divider system 14. For example, and as indicated in FIGS. 2-6, fuel return port 32 may be fluidly coupled to an annular chamber 38 provided in pressurizing valve 34, which may, in turn, be fluidly coupled to aircraft fuel tank 11 (FIG. 1).

In the exemplary embodiment illustrated in FIGS. 2-6, fuel divider system 14 includes two main valves, namely, a fuel divider (FD) valve 42 and an ecology valve 44. In addition, fuel divider system 14 includes a first check valve 46 and a second check valve 48. FD valve 42, ecology valve 44, first check valve 46, and second check valve 48 are each incorporated into main housing assembly 22. FD valve 42 and ecology valve 44 each include multiple ports that are fluidly coupled to each other, to inlet 26, to primary outlet 28, to secondary outlet 30, and to check valves 46 and 48 via various flow passages included in flow passage network 24. Specifically, FD valve 42 includes a first port 50, which is fluidly coupled to inlet 26; a second port 52, which is fluidly coupled to secondary outlet 30 via flow passage 24-1; a third port 54, which is fluidly coupled primary outlet 28 via flow passage 24-2; a fourth port 56, which is fluidly coupled to check valve 46 via flow passage 24-3; a fifth port 58, which is fluidly coupled to third port 54 via flow passage 24-4; and a sixth port 60, which is fluidly coupled to flow passage 24-4, and therefore to third port 54 and fifth port 58, via flow passage 24-5. Ecology valve 44 includes a first port 62, which is fluidly coupled to the outlet of check valve 46 and the inlet of check valve 48 via flow passage 24-6; a second port 64, which is fluidly coupled to third port 54 of FD valve 42 via flow passage 24-7; and a third port 66, which is fluidly coupled to flow passage 24-4, and therefore to third port 54, fifth port 58, and sixth port 60 of FD valve 42, via a flow passage 24-8. Although fuel divider system 14 is illustrated as a two dimensional cross-section in FIGS. 2-6, it will be noted by the skilled practitioner that ports 52, 54, and 58 of FD valve 42 and ports 64 and 66 of ecology valve 44 are each defined, at least in part, by a substantially annular cutout formed in an inner surface of housing assembly 22. For this reason, ports 52, 54, 58, 64, and 66 may referred to as "annular ports" herein. Of course, the number, disposition, and geometries of the ports of FD valve 42 and those of ecology valve 44 may vary in alternative embodiments.

FD valve 42 includes an FD piston 70 and a FD spring 72. FD piston 70 is slidably disposed within housing assembly 22 and movable amongst at least three positions: (i) a flow blocking position (shown in FIGS. 2 and 6) wherein FD piston 70 substantially prevents burn fuel flow from inlet 26 to primary outlet 28 and to secondary outlet 30, (ii) a flow biasing position (shown in FIG. 3) wherein FD piston 70 permits substantially unrestricted fuel flow from inlet 26 to primary outlet 28 and restricted fuel flow from inlet 26 to secondary outlet 30, and (iii) a flow equalizing position (shown in FIGS. 4 and 5) wherein FD piston 70 permits substantially unrestricted fuel flow from inlet 26 to primary outlet 28 and to secondary outlet 30. As appearing herein, the phrase "substantially unrestricted fuel flow" denotes that FD piston 70 that has moved to a position wherein FD piston 70 generally provides the least amount of impedance to fuel flow relative to the amount of impedance provided by FD piston 70 in alternative positions. As shown in FIGS. 2-6, FD piston 70 may seat on an elastomeric ring 73 mounted within an inner wall of housing assembly 22 proximate port 50 in the flow blocking position.

FD piston 70 may assume a variety of geometric forms. In the illustrated exemplary embodiment, FD piston 70 assumes the form of a dual diameter piston having a major outer diameter (OD) portion 74 and a minor OD portion 76 (also referred to as a "head portion" and a "rod portion," respectively). Major OD portion 74 cooperates with housing assembly 22 to define a spring cavity 78, which fluidly communicates with flow passage 24-5 via port 60. FD spring 72 resides within spring cavity 78 and is compressed between an inner wall of housing assembly 22 and an outer surface of major OD portion 74. If desired, and as indicated in FIGS. 2-6, major OD portion 74 may be formed to include a cylindrical cavity 80 that receives a portion of FD spring 72 therein to help retain spring 72 in place. Minor OD portion 76 cooperates with housing assembly 22 to define a fuel inlet chamber 82, which fluidly communicates with connecting conduit 36 via port 50. Lastly, major OD portion 74, minor OD portion 76, and housing assembly 22 collectively define an FD control chamber 84 within housing assembly 22. FD control chamber 84 is fluidly coupled to flow passage 24-3 via port 56. FD control chamber 84 is also fluidly coupled to port 60 via a first channel 86 formed through major OD portion 74. In the illustrated example, FD control chamber 84 comprises an annulus formed around an outer circumference of minor OD portion 76 and adjacent the exposed radial face of major OD portion 74; however, in alternative embodiments, FD control chamber 84 may assume other shapes and dispositions.

During operation of fuel divider system 14, the pressurized burn fuel contained within FD control chamber 84 acts on the exposed radial face of major OD portion 74. In so doing, the fuel within FD control chamber 84 exerts a force on FD piston 70 in opposition to the force exerted thereon by FD spring 72. These antagonistic forces, along with force exerted on major OD portion 74 by the pressurized fuel supplied to spring cavity 78 and the force exerted on minor OD portion 76 by the pressurized fuel supplied to inlet 26 and inlet chamber 82, generally determine the translational position of FD piston 70. To help ensure that FD piston 70 moves in a smooth and controlled manner, a damping bleed may be fluidly disposed within flow passage 24-5 as indicated in FIGS. 2-6 at 71.

Referring still to FIGS. 2-6, ecology valve 44 further includes an ecology valve (EV) piston 92 having one or more sidewall openings 94 formed therethrough; e.g., a plurality of sidewall openings 94 may be angularly spaced around a circumferential section of EV piston 92. EV piston 92 is slidably disposed within housing assembly 22 and movable between a fuel storage position (shown in FIGS. 2 and 3) and a fuel return position (shown in FIGS. 4 and 5). EV piston 92 cooperates with housing assembly 22 to define a fuel storage chamber 96 and an EV control chamber 98 (shown and labeled in FIGS. 4-6). An EV spring 100 is disposed within fuel storage chamber 96 and biases EV piston 92 toward the fuel storage position (FIGS. 2 and 3). If desired, one or more dynamic seals 102 may be disposed between EV piston 92 and an inner surface of housing assembly 22 to minimize burn fuel leakage between ports 62, 64, and 66 of ecology valve 44.

During operation, fuel pressurizing valve 34 supplies pressurized burn fuel to inlet 26 of housing assembly 22. Fuel pressurizing valve 34 may comprise any device suitable for providing inlet 26 with pressurized burn fuel in this manner. In the illustrated exemplary embodiment, fuel pressurizing valve 34 includes a pressurizing valve (PV) piston 104 slidably mounted within a PV housing 106. A PV spring 108 is disposed within a spring cavity 110 provided within PV housing 106 and biases PV piston 104 toward a closed position (shown in FIGS. 2 and 6). A port 112 provided through a sidewall of PV housing 106 enables fluid communication between spring cavity 110 and a reference pressure source ("PO"). An inlet 114 is formed through PV housing 106 and receives metered burn fuel from a fuel supply system, such as fuel supply system 12 described above in conjunction with FIG. 1. When the force exerted on PV piston 104 by the metered burn fuel supplied to inlet 114 exceeds the cumulative force exerted on piston 104 by spring 108 and the burn fuel within spring cavity 110, PV piston 104 moves toward spring 108 and into an open position (shown in FIGS. 3-5). Pressurized burn fuel is thus permitted to flow through pressurizing valve 34, through connecting conduit 36, and into inlet 26 of housing assembly 22.

Operation of the Exemplary Fuel Divider System: Pressurizing Valve and Fuel Divider Valve The manner in which pressurizing valve 34 and FD valve 42 may function during operation of fuel divider system 14 will now be described in conjunction with FIGS. 2-6. Referring initially to FIG. 2, fuel divider system 14 is illustrated prior to GTE start-up. At this juncture, little to no metered burn fuel is provided to inlet 114 of pressurizing valve 34. As a result, the pressure ("P2") of the metered burn fuel supplied to inlet 114 is insufficient to overcome the bias force exerted on PV piston 104 by PV spring 108. PV piston 104 thus remains in the closed position. FD piston 70 is likewise maintained in the flow blocking position by FD spring 72, and little to no burn fuel is permitted to flow through primary outlet 28 to atomizer nozzles 18 (FIG. 1) or through secondary outlet 30 to air blast nozzles 20 (FIG. 1).

Turning now to FIG. 3, fuel divider system 14 is illustrated during GTE start-up. The volume of burn fuel supplied to inlet 114 of pressurizing valve, and therefore the fuel pressure appearing at inlet 114 ("P2"), has increased to a level sufficient to overcome the bias force of PV spring 108 and move PV piston 104 into an open position. This permitted metered burn fuel to flow into port 50 and exert a force on the exposed area of FD piston 70 in the direction of FD spring 72. As the pressure of the burn fuel supplied to inlet 114 ("P3") increased, the force exerted on FD piston 70 by the burn fuel supplied to inlet 114 eventually exceeded the cumulative force exerted on FD piston 70 by spring 72 and the burn fuel within spring cavity 78. FD piston 70 has thus lifted from its seat and moved into the flow biasing position illustrated in FIG. 3. FD piston, now in the flow biasing position, permits burn fuel to fill inlet chamber 82. Notably, the fuel pressure within fuel inlet chamber 82 represents the total burn fuel flow pressure available to atomizer and air blast nozzles 18 and 20 ("PBFN").

From inlet chamber 82, the pressurized burn fuel flows into channel 88 provided through minor OD portion 76. When FD piston 70 is in the flow biasing position (FIG. 3), first and second outlets of channel 88 align with ports 52 and 54, respectively. The first and second outlets of channel 90 thus cooperate with ports 52 and 54 such that burn fuel flows: (i)

into flow passage 24-2, through primary outlet 28, and to the atomizer nozzles 18 (FIG. 1) with minimal impedance, and (ii) into flow passage 24-1, through secondary outlet 30, and to air blast nozzles 20 (FIG. 1) with a predetermined amount of impedance greater than the minimal impedance. The burn fuel flow pressure through primary outlet 28 ("PAT") is consequently biased up relative to flow pressure through secondary outlet 30 ("PAB"), and the volume of fuel flowing through primary outlet 28 and to atomizer nozzles 18 (FIG. 1) is increased relative to the volume of fuel flowing through secondary outlet 30 and to air blast nozzles 30 (FIG. 1).

When FD piston 70 is in the flow biasing position shown in FIG. 3, the burn fuel flowing through annular port 52 is further directed into ports 58 and 60 by flow passage 24-4. As noted above, ports 58 and 60 are fluidly coupled to FD control chamber 84 and spring cavity 78, respectively. The fuel pressures within FD control chamber 84 and spring cavity 78 are thus ported to the same pressure, namely, the pressure of the burn fuel flowing through the secondary outlet 30 ("PAB"). The fuel contained within FD control chamber 84 and spring cavity 78 exert substantially equivalent antagonistic forces on FD piston 70 and thus cancel. Consequently, the pressure of the fuel supplied to inlet 26 ("P3") and acting on the exposed area of minor OD portion 76, alone, need be sufficient to overcome the bias force exerted on FD piston by spring 72 to prevent FD piston 70 from returning to the flow blocking position (FIG. 2). Fuel divider system 14 is thus configured such that, when FD piston 70 is in the flow biasing position, the flow rate of the fuel supplied to inlet 26 ("P3") need remain above a first predetermined minimum flow rate to prevent FD piston 70 from returning to the flow blocking position (FIG. 2). As a non-limiting example, the first predetermined minimum flow rate may be approximately 600 pounds per hour.

FIG. 4 illustrates fuel divider system 14 after engine start-up and during moderate to high flow engine run conditions, such as engine cruise. In this case, the pressure of the fuel supplied to inlet 26 ("P3") has increased to a level sufficient to further compress FD spring 72 and to move FD piston 70 into the flow equalizing position. When FD piston 70 is in the flow equalizing position, burn fuel entering inlet chamber 82 is permitted to flow around minor OD portion 76 and into annular port 52. From annular port 52, the burn fuel flows through passage 24-1 and exits secondary outlet 30 with little restriction. Also from annular port 52, the burn fuel flows through channel 90, into annular port 54, through flow passage 24-2, and exits primary outlet 28 with little restriction. In this manner, FD piston 70 permits substantially unrestricted through primary outlet 28 and secondary outlet 30 when FD piston in the flow equalizing position (indicated in FIG. 4 by arrows 91). This, in turn, results in substantially equalized burn fuel flow through atomizer nozzles 18 and air blast nozzles 20 (FIG. 1).

It is important to note that, when FD piston 70 moves into the flow equalizing position shown in FIG. 4, fluid communication between annular port 58 and FD control chamber 84 is obstructed by major OD portion 74 of FD piston 70. At the same time, an outlet of channel 88 aligns with FD control chamber 84 to permit fluid communication between FD control chamber 84 and fuel inlet chamber 82. Thus, when the FD piston moves into the flow equalizing position, the fuel pressure within FD control chamber 84 is no longer ported to the fuel pressure appearing at secondary outlet 30 ("PAB"). Instead, the fuel pressure within FD control chamber 84 is ported to, and is preferably substantially equivalent to, the fuel pressure within inlet chamber 82 ("PBFN"). By comparison, the fuel pressure within spring cavity 78 remains ported to, and therefore substantially equivalent with, the fuel pressure appearing at secondary outlet 30 ("PAB"). This increase in the fuel pressure within FD control chamber 84 relative to the fuel pressure within spring cavity 78 results in a greater net force exerted on FD piston 70 in the direction of FD spring 72. As a result, the flow rate of the fuel supplied to inlet 26 ("P3") need only remain above a second predetermined minimum flow rate to prevent FD piston 70 from returning to the flow blocking position shown in FIG. 1. Notably, this second predetermined minimum flow rate is less than the first predetermined minimum pressure threshold and may be, for example, approximately 300 pounds per hour. FD piston 70 will consequently remain in the flow equalizing position, and fuel divider system 14 will continue to provide substantially equal fuel flow to atomizer nozzles 18 and air blast nozzle 20, under low burn fuel flow conditions occurring after engine start-up wherein the flow rate of the burn fuel supplied to fuel divider system 14 exceeds the second predetermined minimum flow rate. Further emphasizing this point, FIG. 5 illustrates fuel divider system 14 during a low flow engine run condition wherein relatively little metered fuel flow is supplied to inlet 26 of fuel divider system 14. As a specific example, and again considering the first and second predetermined minimum flow rates to be approximately 600 and 300 pounds per hour, respectively, FIG. 5 may illustrate a flight idle condition wherein burn fuel is supplied to fuel divider system 14 at a flow rate of approximately 400 pounds per hour. As indicated in FIG. 5, FD piston 70 remains in the flow equalizing position, and fuel divider system 14 continues to provide substantially equalized fuel flow through primary outlet 28 and secondary outlet 30 (indicated in FIG. 5 by arrows 91) and to atomizer nozzles 18 and air blast nozzles 20 (FIG. 1). Thus, in contrast to conventional flow divider systems of the type described above, exemplary flow divider system 14 may provide equalized burn fuel flow to a primary and a secondary set of nozzles during low flow post start-up engine conditions, such as flight idle.

FIG. 6 illustrates fuel divider system 14 immediately after engine shut-down. At this juncture, metered burn fuel is no longer provided to inlet 114 of pressurizing valve 34. PV piston 104 has transitioned to a closed position under the influence of PV spring 108, FD piston 70 has moved to the flow blocking position under the influence of FD spring 72, and burn fuel no longer flows through primary and secondary outlets 28 and 30 and to atomizer nozzles 18 and air blast nozzles 20 (FIG. 1).

Operation of the Exemplary Fuel Divider System: Ecology Valve and Check Valves

The foregoing has thus described one manner in which pressurizing valve 34 and FD valve 42 may function during operation of fuel divider system 14 to bias up fuel flow to a primary set of nozzles during engine start-up conditions, while providing substantially equalized flow to primary and secondary sets of nozzles during low flow post start-up engine conditions. One manner in which ecology valve 44, first check valve 46, and second check valve 48 may function during operation of fuel divider system 14 will now be described in conjunction with FIGS. 2-6. As will become apparent from the following description, fuel divider system 14 prevents ecology valve movement during engine start-up and thus avoids the premature introduction of previously-withdrawn burn fuel.

Referring initially to FIG. 2, fuel divider system 14 is illustrated prior to GTE start-up. EV piston 92 has moved into the fuel storage position under the influence of EV spring 100. When moving into the fuel storage position, EV piston 92 removed a predetermined volume of fuel from the engine fuel manifold, which is now temporarily stored within fuel storage chamber 96. Check valves 46 and 48 are maintained in closed positions by the back pressure within flow passages 24-6 and 24-7, respectively.

Turning now to FIG. 3, fuel divider system 14 is depicted during engine start-up. FD piston 70 has moved into the flow biasing position. In the flow biasing position, FD piston 70 cooperates with flow passage network 24 to port the fuel pressure appearing at secondary outlet 30 ("PAB") to FD control chamber 84. The fuel pressure within FD control chamber 84 thus equalizes with the fuel pressure appearing at secondary outlet 30 ("PAB"). As previously stated, FD control chamber 84 is fluidly coupled to the inlet of check valve 46 via flow passage 24-3; thus, the fuel pressure within flow passage 24-3 and appearing at the inlet of check valve 46 has increased, as well. Despite this increase, the fuel pressure within flow passage 24-3 is still insufficient to open check valve 46. Check valve 46 thus remains closed, and little to no burn fuel is permitted to flow through flow passage 24-6, through port 62, and into EV control chamber 98.

FIG. 4 illustrates fuel divider system 14 after engine start-up and during moderate to high flow engine run conditions, such as engine cruise. FD piston 70 has moved into the flow equalizing position, and fuel pressure within FD control chamber 84 and flow passage 24-3 is now substantially equivalent to fuel pressure within inlet chamber 82 ("PBFN"). As shown in FIG. 4, check valve 46 has moved to an open position thereby permitting pressurized fuel to flow through flow passage 24-6, through port 62, and into EV control chamber 98. The pressurized fuel within EV control chamber 98 exerts a force on EV piston 92 sufficient to overcome the cumulative force exerted on EV piston 92 by EV spring 100 and the burn fuel held within fuel storage chamber 96. EV piston 92 thus moves toward the fuel return position (shown in FIG. 5), and openings 94 align with annular port 66. As EV piston 92 moves toward the fuel return position, a portion of the fuel previously stored within fuel storage chamber 96 is forced into annular port 66, flows through flow passages 24-8 and 24-4, and ultimately exits fuel divider system 14 via secondary outlet 30. This burn fuel is then directed into combustion chamber 16 by air blast nozzles 20 (FIG. 1) for combustion. It should thus be appreciated that fuel divider system 14 prevents the movement of ecology valve 44 until the fuel pressure within FD control chamber 84 is substantially equivalent to the fuel pressure within inlet chamber 82 ("PBFN"), the fuel flow rate through primary outlet 28 and secondary outlet 30 has been equalized, and GTE start-up has been completed. Notably, at any given interval, the volume of fuel reintroduced from fuel storage chamber 96 is substantially equivalent to the volume of fuel received by EV control chamber 98; thus, the reintroduction of burn fuel by ecology valve 44 has little to no effect on net metered fuel flow through fuel divider valve 14.

Referring still to FIG. 4, it can be seen that a rate limit bleed 120 is fluidly disposed within flow passage 24-3 between port 56 and check valve 46. Rate limit bleed 120 serves to limit the flow rate through port 62 and into EV control chamber 98 to ensure that ecology valve movement, and therefore that the reintroduction of previously-withdrawn burn fuel, occurs in a smooth and controlled manner. It can also be seen in FIG. 4 that, when PV piston 104 is in the open position, a channel 116 provided through PV piston 104 aligns with a sidewall port 118, which is fluidly coupled to the outlet of check valve 48 via connecting conduit 40. As a result, the pressure appearing at the outlet of check valve 48 increases to a level sufficient to maintain check valve 48 in a closed position despite the increase in pressure upstream thereof.

FIG. 5 illustrates fuel divider system 14 during low flow engine run conditions, such as flight idle. The fuel pressure within FD control chamber 84 still corresponds, and preferably is substantially equivalent, to the fuel pressure appearing at inlet 26; however, P3 has decreased to a level below the first predetermined pressure threshold (e.g., 600 pounds per hour) and above the second predetermined pressure threshold (e.g., 300 pounds per hour). The fuel pressure within flow passage 24-3 has decreased along with the pressure appearing at inlet 26 ("P3"). Check valve 46 remains in the closed, and the fuel pressure within EV control chamber 98 thus remains at a level sufficient to maintain EV piston 92 in the fuel return position shown in FIG. 5.

FIG. 6 illustrates fuel divider system 14 immediately after GTE shut-down. Metered burn fuel is no longer supplied to inlet 114 of pressurizing valve 34, and PV piston 104 has returned to a closed position. The back pressure exerted on check valve 48 has consequently decreased, and check valve 48 has opened. EV spring 100 expands, and EV piston 92 moves toward the fuel storage position shown in FIGS. 2 and 3. This causes a predetermined quantity to flow from the fuel engine manifold into fuel storage chamber 96. As EV piston 92 moves toward the fuel storage position (FIGS. 2 and 3), burn fuel flows from EV control chamber 98, through check valve 48, through connecting conduit 40, through pressurizing valve 34, and ultimately returns to fuel supply system 12. When engine operation is again initiated, fuel supply system 12 supplies this burn fuel to fuel divider system 14, which then apportions the burn fuel between primary outlet 28 and secondary outlet 30 in the above-described manner.

In view of the above, there has been provided an exemplary embodiment of a fuel divider system that biases up fuel flow to a primary set of nozzles (e.g., atomizer nozzles) during engine start-up conditions and that provides substantially equal flow to primary and secondary sets of nozzles during low flow post start-up engine conditions, such as flight idle. It should be appreciated that, in the above-described exemplary embodiment, the fuel divider system includes an ecology valve and prevents ecology valve movement, and thus the premature reintroduction of burn fuel, during engine start-up. It should further be appreciated that, in the above-described exemplary embodiment, the fuel divider system assumes the form of a closed-loop hydromechanical system and consequently does not require external controllers and other such electronic components.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:
1. A fuel divider system, comprising:
a housing assembly;
a flow passage network formed through the housing assembly and having an inlet,
a primary outlet, and a secondary outlet;
a fuel divider piston fluidly coupled to the flow passage network, the fuel divider piston slidably disposed within the housing assembly and movable between a flow biasing position and a flow equalizing position;

an fuel divider control chamber fluidly coupled to the flow passage network and in fluid communication with the fuel divider piston such that fuel within the fuel divider control chamber exerts a force on the fuel divider piston urging the fuel divider piston toward the flow biasing position;

an inlet chamber at least partially defined by the fuel divider piston and the housing assembly, the inlet chamber fluidly coupled to the inlet and co-axial with the fuel divider control chamber; and at least one channel provided through the fuel divider piston and configured to cooperate with the flow passage network to port the fuel divider control chamber to: (i) the fuel pressure at the secondary outlet when the fuel divider piston is in the flow biasing position, and (ii) the fuel pressure within the inlet chamber when the fuel divider piston is in the flow equalizing position.

2. The fuel divider system according to claim 1 wherein the fuel divider piston permits substantially unrestricted flow from the inlet to the primary outlet and restricted flow from the inlet to the secondary outlet when in the flow biasing position.

3. The fuel divider system according to claim 2 wherein the fuel divider piston permits substantially unrestricted flow from the inlet to the primary outlet and to the secondary outlet when in the flow equalizing position.

4. The fuel divider system according to claim 1 wherein the fuel divider piston is further movable to a flow blocking position in which the fuel divider position substantially prevents fuel flow from the inlet to the primary outlet and to the secondary outlet.

5. The fuel divider system according to claim 4 wherein the fuel divider valve further comprises a spring disposed in the housing assembly and biasing the fuel divider piston toward the flow blocking position.

6. The fuel divider system according to claim 5 wherein the fuel divider piston comprises:
a first portion; and a second portion having an outer diameter greater than an outer diameter of the first portion, the spring compressed between an inner wall of the housing assembly and the second portion.

7. The fuel divider system according to claim 6 wherein the fuel within the fuel divider control chamber exerts a force on an exposed area of the second portion in opposition to the spring.

8. The fuel divider system according to claim 6 wherein the fuel divider control chamber is formed around the first portion and adjacent the second portion.

9. The fuel divider system according to claim 4 wherein fuel divider system is configured such that the fuel divider piston is prevented from moving into the flow blocking position when the flow rate through the inlet exceeds: (i) a first predetermined minimum flow rate when the fuel divider piston is in the flow biasing position, and (ii) a second predetermined minimum flow rate when the fuel divider piston is in the flow equalizing position, the second predetermined minimum flow rate being less than the first predetermined minimum flow rate.

10. The fuel divider system according to claim 1 wherein the fuel divider piston cooperates with the housing assembly to define a spring cavity in which the spring is disposed, the fuel divider piston cooperating with the flow passage network to: (i) permit fuel flow between the fuel divider control chamber and the spring cavity when the fuel divider piston is in the flow biasing position, and (ii) substantially block fuel flow between the fuel divider control chamber and the spring cavity when the fuel divider piston is in the flow equalizing position.

11. The fuel divider system according to claim 1 wherein at least one channel is configured to cooperate with the flow passage network such that the fuel pressure within fuel divider control chamber is substantially equivalent to the fuel pressure at the secondary outlet when the fuel divider piston is in the flow biasing position.

12. The fuel divider system according to claim 11 wherein at least one channel is configured to cooperate with the flow passage network such that the fuel pressure within fuel divider control chamber is substantially equivalent to the fuel pressure at the inlet when the fuel divider piston is in the flow equalizing position.

13. The fuel divider system according to claim 1 further comprising an ecology valve, the ecology valve comprising:
an ecology valve piston slidably mounted within the housing assembly; and
an ecology valve control chamber defined by the housing assembly and the ecology valve piston, the ecology valve control chamber fluidly coupled to the fuel divider control chamber.

14. The fuel divider system according to claim 13 further comprising a rate limit bleed fluidly coupled between the ecology valve control chamber and the fuel divider control chamber.

15. The fuel divider system according to claim 13 further comprising a check valve fluidly coupled between the ecology valve control chamber and the fuel divider control chamber.

16. The fuel divider system according to claim 13 wherein the flow passage network further comprises a fuel return port fluidly coupled to the ecology valve control chamber.

17. The fuel divider system according to claim 1 wherein the fuel divider piston comprises a dual diameter piston, and wherein the fuel divider control chamber comprises an annulus defined by the dual diameter piston and the housing assembly.

18. A fuel divider system, comprising:
a housing assembly;
a flow passage network formed through the housing assembly and having an inlet, a primary outlet, and a secondary outlet;
a fuel divider piston slidably disposed in the housing assembly and movable amongst: (i) a flow blocking position wherein the fuel divider piston substantially prevents flow from the inlet to the primary outlet and to the secondary outlet, (ii) a flow biasing position wherein fuel divider piston generally permits unrestricted flow from the inlet to the primary outlet and restricted flow from the inlet to the secondary outlet, and (iii) a flow equalizing position wherein the fuel divider piston generally permits unrestricted flow from the inlet to the primary outlet and to the secondary outlet;
a spring biasing the fuel divider piston toward the flow blocking position; an fuel divider control chamber defined by the fuel divider piston and the housing assembly and co-axial with the fuel divider piston, the fuel within the fuel divider control chamber exerting a force on the fuel divider piston in opposition to the spring; and
at least one channel provided through the fuel divider piston and configured to cooperate with the flow passage network to port the fuel divider control chamber to: (i) the fuel pressure at the secondary outlet when the fuel divider piston is in the flow biasing position, and (ii) the fuel pressure within the inlet chamber when the fuel divider piston is in the flow equalizing position.

19. A fuel divider system, comprising:
a housing assembly;
a flow passage network formed through the housing assembly and having an inlet, a primary outlet, and a secondary outlet;
a fuel divider piston fluidly coupled to the flow passage network, the fuel divider piston slidably disposed within the housing assembly and movable between a flow biasing position and a flow equalizing position;
an fuel divider control chamber fluidly coupled to the flow passage network, and extending around the fuel divider piston;
an inlet chamber at least partially defined by the fuel divider piston and the housing assembly, the inlet chamber fluidly coupled to the inlet and co-axial with the fuel divider control chamber;
at least one channel provided through the fuel divider piston and configured to cooperate with the flow passage network such that the fuel pressure within the fuel divider control chamber is substantially equivalent to: (i) the fuel pressures at the secondary outlet when the fuel divider piston is in the flow biasing position, and (ii) the fuel pressure within the inlet chamber when the fuel divider piston is in the flow equalizing position; and
an ecology valve fluidly coupled to the fuel divider control chamber and to the flow passage network.

20. The fuel divider system according to claim 19 wherein the ecology valve comprises:
an ecology valve piston slidably disposed within the housing assembly, the ecology valve piston movable between a fuel storage position and a fuel return position;
an ecology valve control chamber fluidly coupled to the fuel divider control chamber and defined by the ecology valve piston and the housing assembly; and
a spring disposed in the housing assembly and biasing the ecology valve piston toward the fuel storage position.

* * * * *